United States Patent [19]
Kikinis

[11] Patent Number: 5,220,521
[45] Date of Patent: Jun. 15, 1993

[54] FLEXIBLE KEYBOARD FOR COMPUTERS

[75] Inventor: Dan Kikinis, Santa Clara, Calif.

[73] Assignee: Cordata Incorporated, Geneva, Switzerland

[21] Appl. No.: 816,109

[22] Filed: Jan. 2, 1992

[51] Int. Cl.⁵ .......................... G06F 1/00; G06F 3/00
[52] U.S. Cl. ............................. 364/709.08; 364/708
[58] Field of Search ............... 364/709.01, 709.08, 364/708, 709.11

[56] References Cited

U.S. PATENT DOCUMENTS

| | | | |
|---|---|---|---|
| 4,141,074 | 2/1979 | Popper | 364/709.08 X |
| 4,261,042 | 4/1981 | Ishiwatari et al. | 364/709.08 |
| 4,263,659 | 4/1981 | Hirata et al. | 364/709.08 |

FOREIGN PATENT DOCUMENTS 60-3579  1/1985  Japan ........................ 364/709.01

Primary Examiner—Jerry Smith
Assistant Examiner—Chuong D. Ngo
Attorney, Agent, or Firm—Donald R. Boys

[57] ABSTRACT

A keyboard for a computer molded from a flexible material, and rollable into a cylinder for transport and storage. In a particular embodiment, the keyboard is assembled in two layers, one having molded dome structures for key, and the other sensors and flexible traces for converting keystrokes to electrical signals.

12 Claims, 9 Drawing Sheets

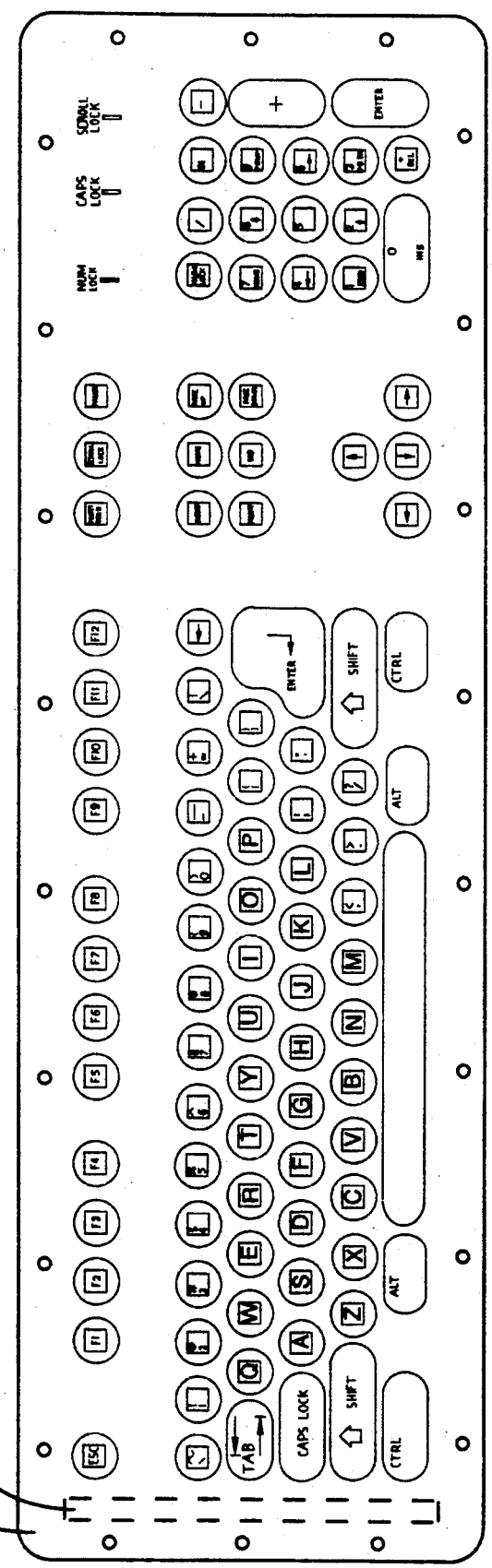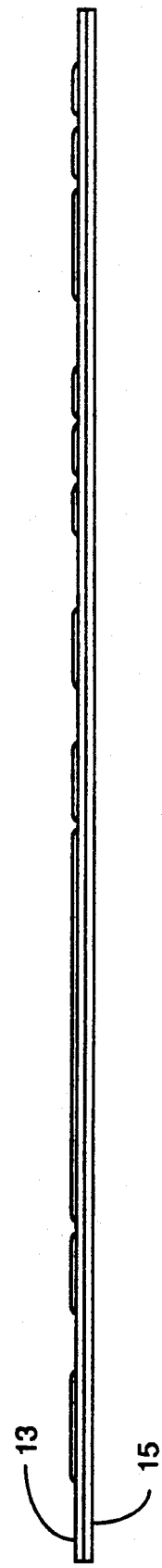
Fig. 1A
Fig. 1B

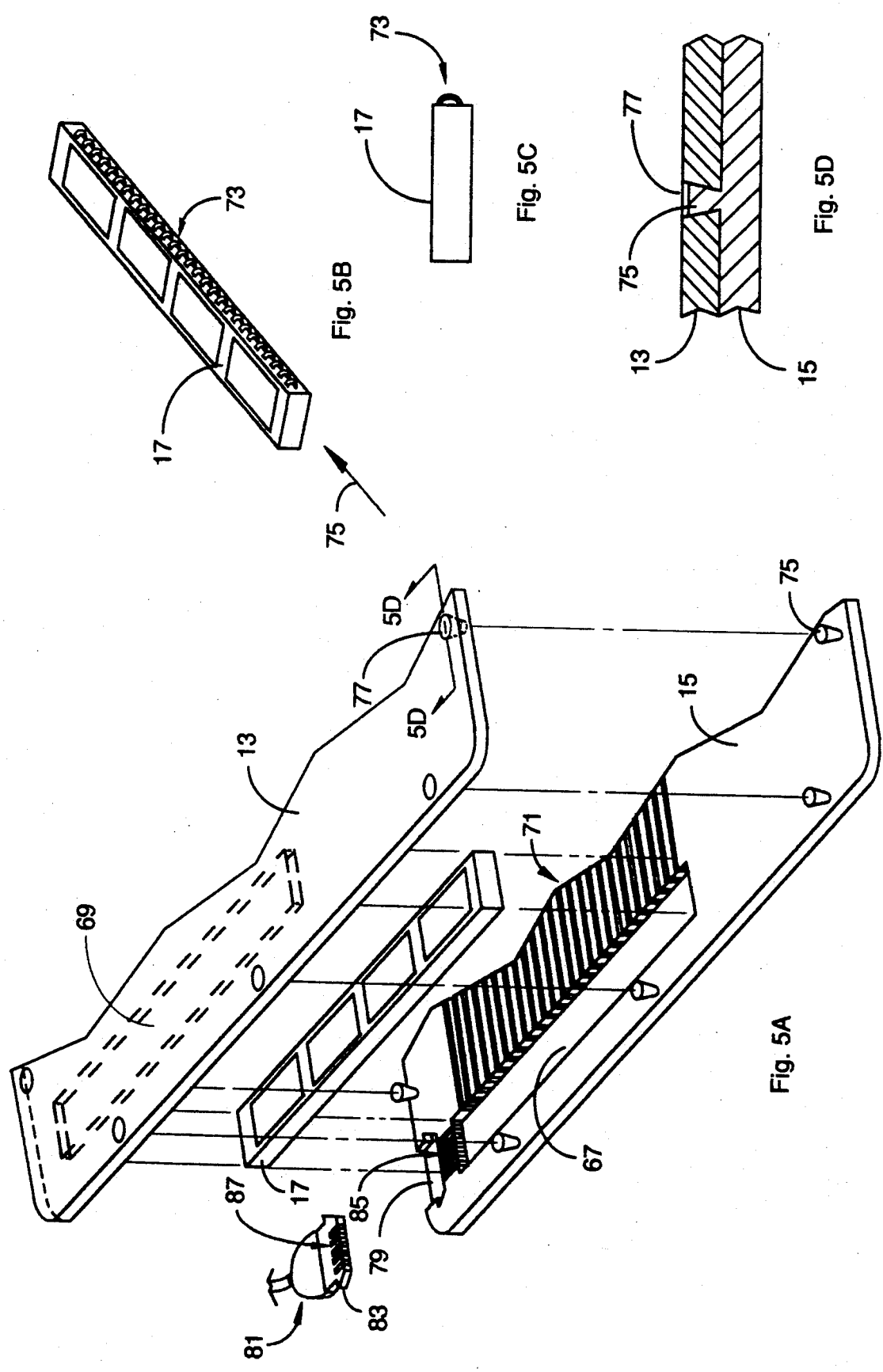

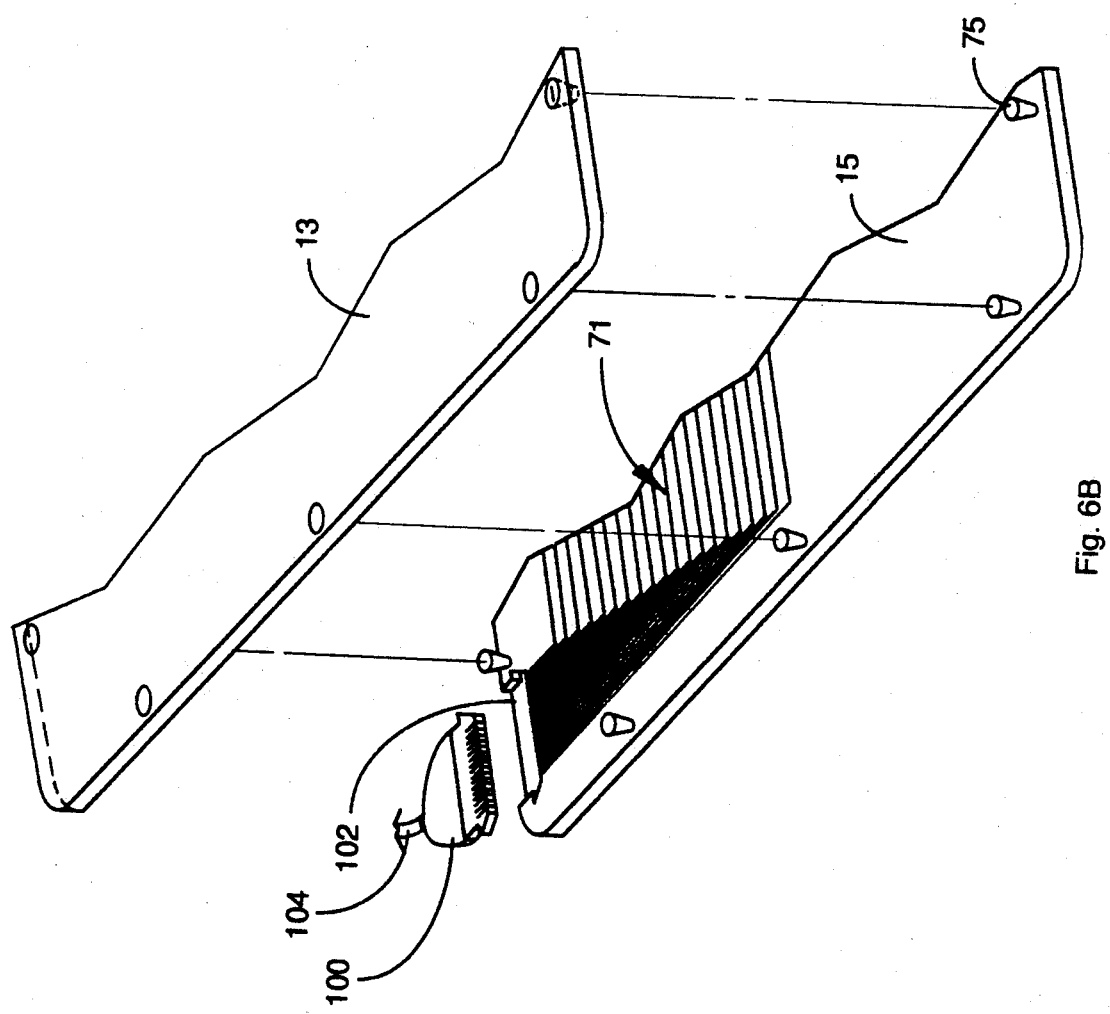

FLEXIBLE KEYBOARD FOR COMPUTERS

FIELD OF THE INVENTION

The present invention is in the area of input devices for computer systems, and pertains in particular to keyboard input devices.

CROSS REFERENCE TO RELATED DOCUMENTS

The present invention is the subject of Disclosure Document No. 290865 filed with Patent and Trademark Office Sep. 9, 1991.

BACKGROUND OF THE INVENTION

All computer systems require user input to perform dedicated functions. In some cases the only input needed is a signal to commence processing according to a preprogrammed list of instructions, typically called a program.

There are dedicated computer systems for receiving special signals, and for automatically processing the signals to some purpose, and storing or displaying a result. An example would be a computerized environmental monitoring station. More commonly, however, computer systems need periodic, and often frequent, alphanumeric input. An example is in the case of word processing programs, which accept "typewritten" information and store the input, which may be further processed, displayed, or printed in some desired fashion. Computer systems, as a result, almost invariably have keyboards, simulating typewriter keyboards, as an interface for user input.

Keyboards for computers are demanding projects for electromechanical designers, and are arguably the most used and abused part of a computer system. The keyboard, moreover, is a relatively intricate mechanical system, typically requiring a number of moving and interacting parts, and the parts must be capable of being exercised many thousands of times without failure.

Keyboards, too are subject to a constant rain of foreign matter, none of which is usually beneficial to operation. Dust, dirt, moisture, spilled liquids, skin and fingernail material, and more, are common intruders to a keyboard. A good keyboard design has to protect the working elements from intrusion of foreign matter.

Another demanding aspect of keyboard design is the matter of sensitivity to keystroke. For example, some users apply considerable pressure in operating a key, and prefer to use a keyboard that is insensitive to relatively light touch. Other users, however, prefer response to very light touch. There are among users, of course, all shades of preference between the extremes. A related characteristic important to users is the feel of the keys.

In the development of relatively small computer systems, such as desktop computers, useful for word processing, accounting, and related tasks, portability has become an important characteristic. Laptop models, and even smaller notebook computers, continue to be developed for users who desire and need to work with their computers in a variety of places. Traveling executives and salesmen are examples of such users.

There are many challenging issues in the development of keyboards for small, portable computers in addition to the demands described above common to all keyboard design. Keyboards for portable computers typically have to be relatively smaller than the well-known standard sizes for desktop computers. Such keyboards need to be light, as well, and requirements for durability remain, and are often more demanding, than for other keyboards.

What is clearly needed is a new design and material approach to keyboards to meet the increasingly difficult demands. A keyboard that could be folded or rolled into a small and portable package would be an advantage for portable use, and would be applicable to desktop models as well. Moreover, a roll-up keyboard would allow full-size keyboards for laptop and notebook computers.

SUMMARY OF THE INVENTION

A flexible keyboard is provided according to the present invention formed of at least one layer of rollable flexible material. There are flexible keys formed in the material for converting finger motion into keystrokes, and sensors under the flexible keys for sensing keystrokes and creating electrical signals in response. Flexible electrical conductors contacting the sensors communicate the electrical signals away from the sensors.

The keyboard comprises a communication system for sending information relative to the electrical signals away from the flexible keyboard. The keyboard is also rollable into a cylinder for storage and unrollable to a flat aspect for use.

In one embodiment the communication system comprises a microprocessor-based keyboard controller carried within the keyboard and in contact with the flexible electrical conductors, and a cable, the controller for creating coded signals based on the electrical signals, and the cable for bringing power from the computer and for carrying the coded signals.

In another embodiment the keyboard has two layers with flexible keys molded into the upper of the two. In this embodiment the sensors and the electrical conductors are implemented on the lower layer. The two layers are fastened together in this by a flexible arrangement that allows the layers to move relative to one another when the keyboard is rolled into a cylinder.

In the keyboard of the invention, there are alternative ways for communicating keystrokes and keystroke combinations to an associated computer. A cable with multiple traces may communicate electrical signals to the computer, where a controller may convert the signals to digital data for the computer bus, or, alternately, a controller may be carried in the flexible keyboard. In the case of a controller carried in the keyboard, encoded data may be sent to the computer by cable, by alteration of a magnetic field, or by light signals.

The flexible keyboard of the invention provides for compact storage and for a full sized keyboard to be used with portable computers with attendant storage space difficulty.

BRIEF DESCRIPTION OF THE DRAWINGS

FIG. 1A is a plan view of a flexible, roll-up keyboard according to the present invention.

FIG. 1B is an elevation view of FIG. 1A.

FIG. 5A is an isometric view of the end of the flexible keyboard where the control circuitry is housed, showing the layer separated to illustrate internal details.

FIG. 5B shows the control circuitry module at an angle of about 90 degrees from the view of FIG. 5A.

FIG. 5C is a view of the control module in the direction of arrow 75 to illustrate the arrangement of contact pads relative to the module.

FIG. 5D is a section view taken along line 5D—5D of FIG. 5A with the two layers joined.

FIG. 6B shows an alternative embodiment wherein the wiring matrix is connected directly to a computer through a connecting cable.

DESCRIPTION OF THE PREFERRED EMBODIMENTS

FIG. 1A is a plan view of a flexible, roll-up keyboard according to the present invention. FIG. 1B is an elevation view of FIG. 1A. In the embodiment shown by FIG. 1A, the keyboard has a layout according to the popular "IBM advanced" format. The flexible keyboard of the invention can be implemented in any convenient format. In this embodiment the dimensions are about 50 cm. long and 20 cm. wide.

The keyboard is formed by two molded layers of flexible material, such as polyurethane, although there are a number of other suitable materials, among them natural rubber and several types of synthetic rubber. An upper layer 13 has shaped pads for keys, and a lower layer 15 has electrically conductive traces forming circuitry for communicating keystrokes to control circuit module 17 located in a pocket between the layers. A battery may also share the pocket in some embodiments, or be carried in a similar pocket elsewhere between the layers.

The two flexible layers fasten together in the embodiment of FIG. 1A and FIG. 1B by flexible appendages from one layer "snapping" into receptacles in the other, which provides for relative movement between the layers when the keyboard is rolled up for transport or storage. Details of a key cell, traces, layer attachment, and so forth are provided further below.

Figure 1C:
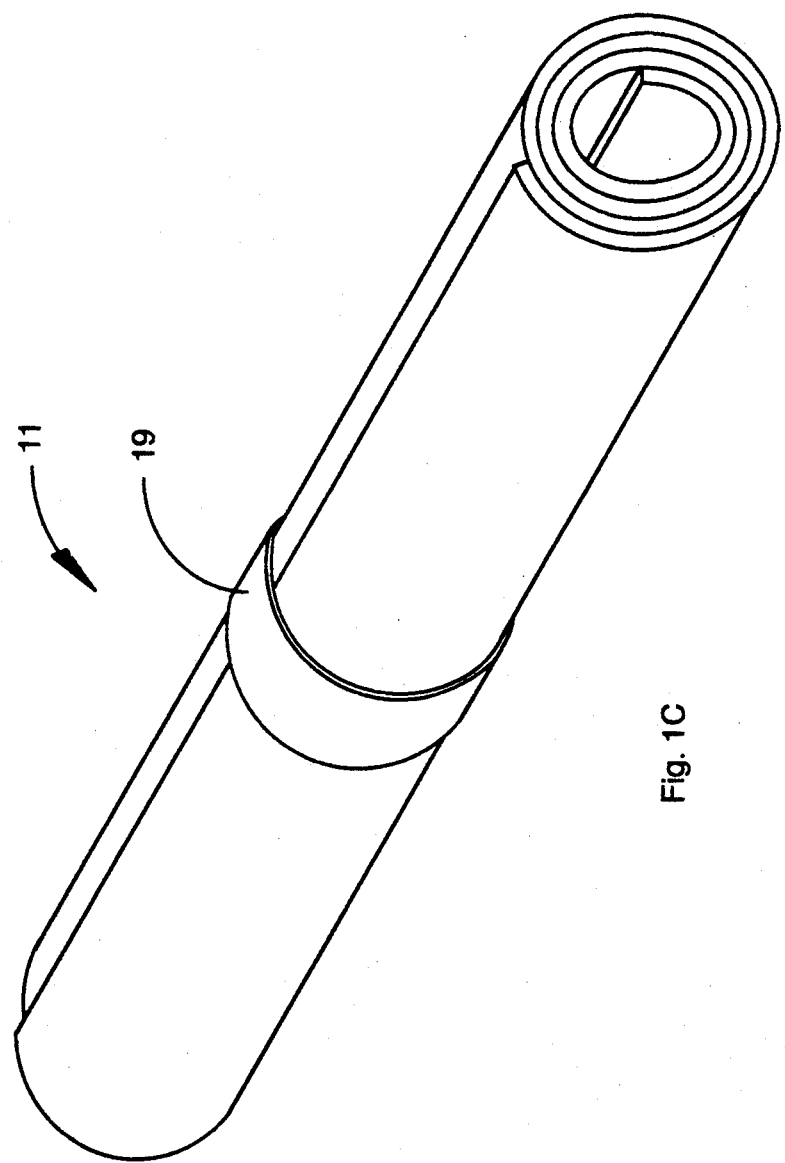
FIG. 1C shows the flexible keyboard of FIG. 1A rolled into a compact cylinder and secured by a band.

FIG. 1C shows flexible keyboard 11 of FIG. 1A rolled into a compact cylinder and secured by a band 19. In this view the band is a simple plastic cylinder, but could be any of a number of alternative devices, such as rubber bands, cord, Velcro loops, and the like. There are also several ways that fasteners may be attached to the keyboard to keep the keyboard rolled up, such as Velcro pads attached by adhesive.

Figure 2:
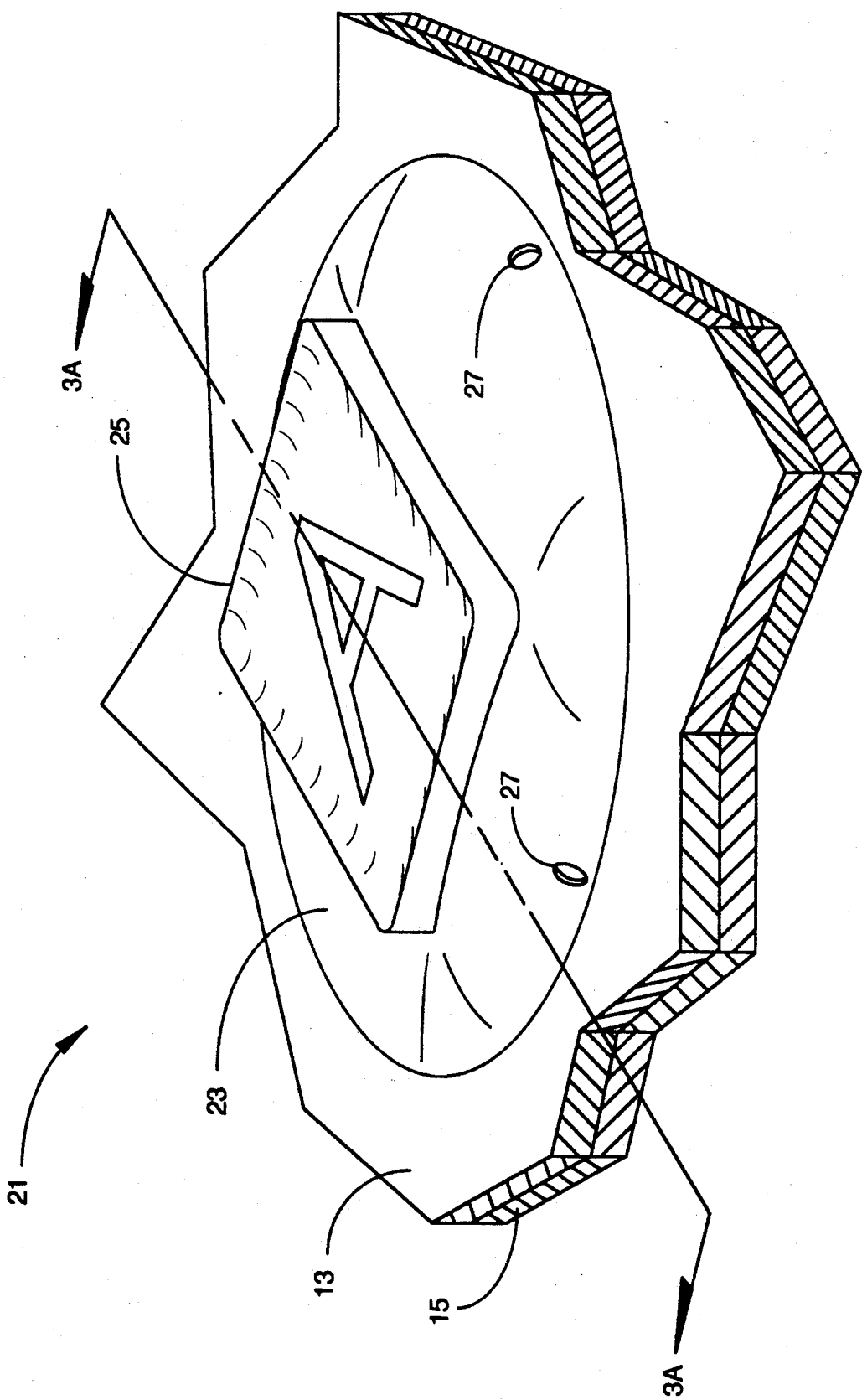
FIG. 2 is an isometric view of a single key cell 21 in the flexible keyboard according to the embodiment of FIGS. 1A and 1B.

FIG. 2 is an isometric view of a single key cell 21 in the flexible keyboard according to the embodiment of FIGS. 1A and 1B. The key cell is based on a dome shape 23 molded into upper layer 13, which provides for necessary vertical movement to accomplish a contact closure for a keystroke and to prevent closure otherwise. The molded dome shape includes a finger pad 25 molded at the top of the dome. The finger pad may have a concave upper surface with letter or character symbols, such as the letter "A" shown in FIG. 2, applied to the upper surface. The letters or characters may be silkscreened, printed, or applied by a number of other techniques known in the art. The letters and characters may alternatively be molded into the surface as depressions below the level of the finger pad surface, so repeated use is less likely to wear the letters and characters away. Additionally, there may also be "breather" openings 27 through the sidewall of the dome structure to allow air under the dome to escape when a keystroke is made. When a user presses down on the dome, the dome collapses, and when the pressure is removed, the dome returns to its original shape. That is, the "normal" position of the dome is in the uncollapsed condition.

Figure 3B:
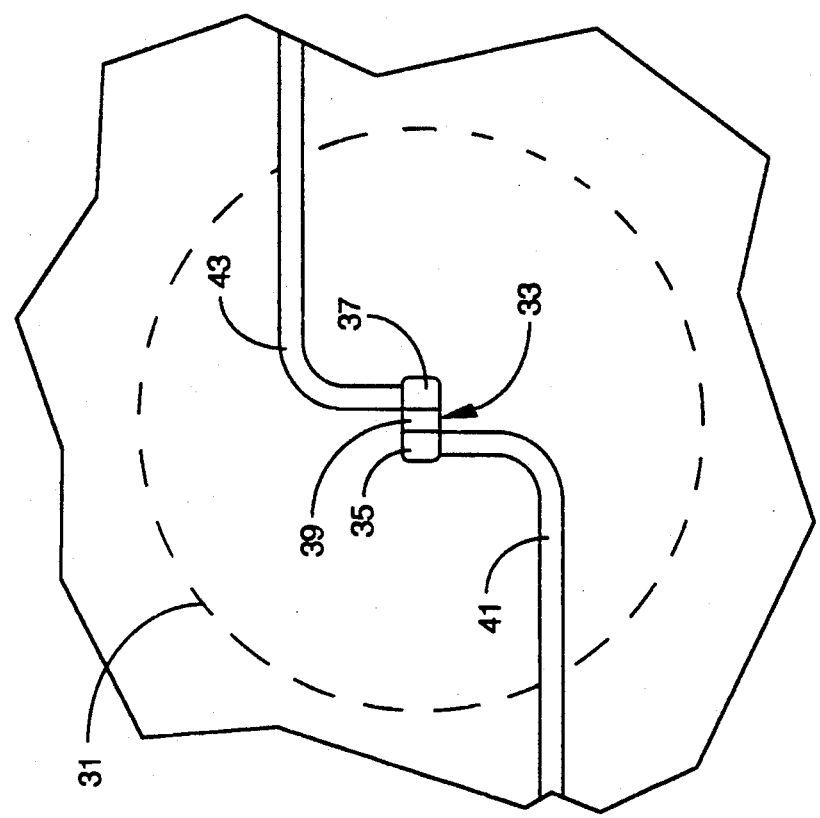
FIG. 3B is a plan view of the lower layer at the key cell of FIG. 3A in the direction of arrow 29.
Figure 3A:
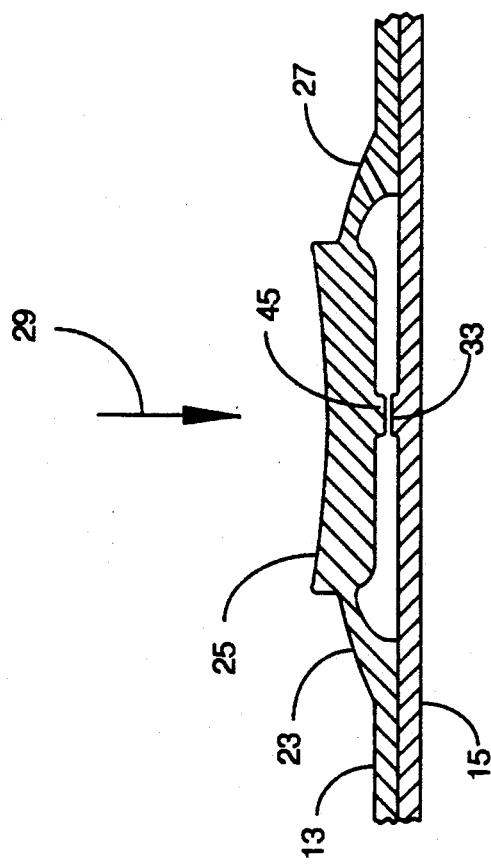
FIG. 3A is a section view of the key cell of FIG. 2 taken along line 3A—3A of FIG. 2.

FIG. 3A is a section view of the key cell of FIG. 2 taken along line 3A—3A. Lower layer 15 and upper layer 13 are joined by a fastening technique (not shown) in a manner to position each dome structure in upper layer 13 over the corresponding conductive structure of lower layer 15. The fastening technique is described in detail below.

Lower layer 15, as described briefly above, has electrically conductive traces for signalling keystrokes to control circuit module 17, for encoding the signals to be transmitted to a computer. FIG. 3B is a plan view of layer 15 at the key cell of FIG. 3A in the direction of arrow 29. Dotted circle 31 represents the outer periphery of dome structure 23 of upper layer 13.

In about the center of the dome structure area, lower layer 15 has a raised portion 33, also seen in elevation in FIG. 3A. The upper surface of raised portion 33 is electrically conductive in regions 35 and 37, but not in central region 39. An electrically conductive trace 41 connects to conductive region 35, and another electrically conductive trace 43 connects to conductive region 37. Raising portion 33 above the level of the surface of layer 15 is primarily a convenience rather than a requirement. Also, there are a number of ways conductivity might be imparted to the conductive regions. For example, the traces could be formed by coating the entire surface with conductive material, then removing material to shape the traces. Conductive material could be molded into the flexible material, as well, and there are other ways.

Referring to FIG. 3A, there is a contact closure extender portion 45 on the lower surface of finger pad 25 that is similar to raised portion 33 on lower layer 15, and positioned directly above portion 33 when layers 13 and 15 are joined. The underside of extender portion 45 is also electrically conductive, and forms a contact closure element for selectively providing electrical closure between traces 41 and 43 when a user depresses dome 23 by finger pressure. Contact closure causes a signal to be transmitted to control circuit module 17 to be coded for transmission. The traces and other regions of conductive material can be formed on the flexible surfaces of the molded layers in a number of different ways. In the embodiment desribed here, these conductive regions may be provided by a conductive, rubber-based coating applied in a conventional manner, such as by silkscreening, and other masking techniques.

It will be apparent to one skilled in the art that there are many variations that could be used for the sidewalls of the dome for an individual key cell. Wall thickness and angle can be varied, for example, to vary the force required to perform a keystroke, which affects the "feel" of the key to a user. Similarily, the key cell can be designed with different distances between raised portion 33 and extended portion 45. As shown in FIG. 2, there may be vents 27 in dome 23 to allow air to escape from the key cell when it is depressed. The feel of a keystroke can also be varied by varying the number or size of vents 27.

It is apparent in the plan view FIG. 1A, that there are several different sizes and shapes of key cells in the pattern of the keyboard that are not of the size and shape of the key cell shown in FIGS. 2, 3A, and 3B, but larger. The Enter key is an example. In these cases, substantially all of the upper surface is a finger pad, and the wall and upper sections are designed to provide a similar resistance to manipulation as a smaller key cell.

In the case of these larger key cells, more extensive contact closure patterns are provided on raised portions of lower layer 15 than the simple pattern shown in FIG. 3B, and corresponding contact closure pads are provided so a keystroke will be accomplished regardless of where on the fingerpad a user depresses the fingerpad.

Figure 4B:
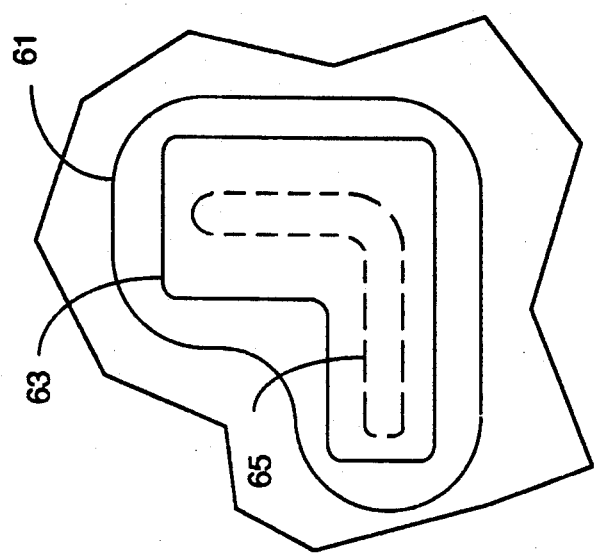
FIG. 4B is a plan view of the upper layer from the same vantage as for FIG. 4A.
Figure 4A:
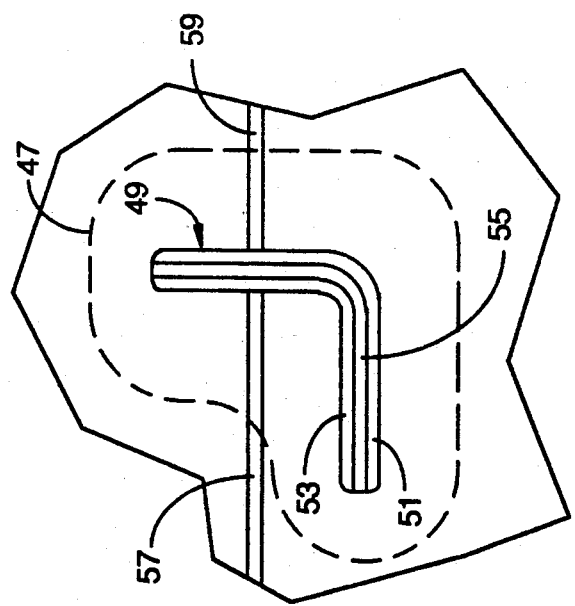
FIG. 4A is a plan view of the lower layer at the position of the Shift key.

FIG. 4A is a plan view of lower layer 15 at the position of the Enter key to illustrate this principle. Upper layer 13 is removed in this view. In FIG. 4A, dotted line 47 outlines the region of the Enter key on the keyboard of FIG. 1A. Raised portion 49 is shaped to cover the central area enclosed by the extended key cell. Regions 51 and 53 are electrically conductive, and region 55 between the conductive regions is non-conductive. Trace 57 connects to region 53 and trace 59 connects to region 51.

FIG. 4B is a plan view of upper layer 13 from the same vantage as for FIG. 4A. Line 61 is the outline of the dome area for the Enter key, and line 63 is the outline of the fingerpad area for the Enter key. Dotted outline 65 is the outline for a contact closure extension on the bottom surface of upper layer 13 matching the shape of raised portion 49 of FIG. 4A. The underside of the contact closure extension is electrically conductive as described for the single key cell of FIG. 3A. This arrangement for the contact closure structure allows larger areas to function similarly to the smaller areas.

It will be apparent to one with skill in the art that a long, straight contact closure structure similar to that described for the Enter key would be useful for the space bar, and other shapes could be provided for other keys.

The keyboard of the present invention as thus far described is what is known in the art as a "hard contact" keyboard, which simply means that the keystrokes are contact closures. The "wiring" provided by the electrically conductive traces described above amounts to a conventional matrix circuit generally used in the art for this kind of keyboard. The matrix circuit may be connected to an on-board microprocessor which "reads" the contact closures and codes the information for transmission to a computer. Similarly, the matrix circuit could interface with a multi-lead cable for connection to a computer, and the controller for converting key strokes to digital data for the computers data bus could be in the computer itself, rather than at the keyboard.

FIG. 5A is an isometric view of the end of the flexible keyboard where the control circuitry can be housed, showing layers 13 and 15 separated to illustrate internal details. Lower layer 15 has a pocket 67 for positioning and retaining control circuit module 17, and upper layer 13 has a matching pocket 69, such that when the layers are joined, the control circuit module is enclosed and retained.

Electrically conductive traces 71 comprise the traces described above associated with the individual key cells, arranged in a conventional matrix for signalling contact closures of individual keys and key combinations. The traces are formed on the surface of lower layer 15 and wrap over the edge of pocket 67, and down the side of the pocket, forming contact pads for interconnecting with control circuit module 17.

FIG. 5B shows control circuit module 17 at an angle of about 90 degrees from the view of FIG. 5A. Control circuit module 17 is shown as an encapsulated unit comprising a microprocessor and associated circuitry for monitoring key activity, encoding the activity, and transmitting the encoded data an associated computer. Encapsulated with module 17 are contact pads 73 formed of metallic conductor material, such as wire or strip. Module 17 comprises the conventional control circuitry commonly used in the art for coding keystrokes, as communicated by the conventional wiring matrix to the key closures, for transmission to an associated computer.

FIG. 5C is a view of module 17 in the direction of arrow 75 to illustrate the arrangement of contact pads 73 relative to module 17. Contacts 73 are formed to extend from module 17 to one side, so when module 17 is inserted in pocket 67, contact pads 73 urge against traces 71 on the side of the pocket, establishing electrical contact between pads 73 and traces 71. The arrangement shown allows relative movement between components when the flexible keyboard is rolled for transport or storage, without damage to conductors or other components.

Keyboard 11 of the present invention has been described above as having two layers, which is preferred by the inventor to facilitate matrix wiring and other details of the invention. It has been found that some relative movement between the layers is useful when rolling the keyboard as shown in FIG. 1C. Accordingly, keyboard layers 13 and 15 are connected by providing receptacle openings in one layer and connector extensions in the other. Extension 75 from lower layer 15 and opening 77 in upper layer 13 as shown in FIG. 5A are exemplary of such connection means.

FIG. 5D is a section view taken along line 5D—5D of FIG. 5A with layer 13 and 15 joined. Bore 77 is formed in the shape of an inverted, truncated cone when layer 13 is molded, and extension 75 is formed in a similar shape when layer 15 is molded. To join the two layers, the molded extensions are forced into the openings. When the keyboard is subsequently rolled, the extensions flex, allowing limited relative movement between the layers.

It will be apparent to one skilled in the art that there are other, essentially equivalent ways to join the two layers. For example, openings could be provided in both layers, and a separate flexible connector inserted into matching openings to hold the two layers together. There are similarly many different shapes that might be used for the extensions or connectors and the openings.

To serve as an input device for a computer it is necessary that the keystrokes be communicated to the computer. In one embodiment, as described above, keyboard 11 of the present invention is provided with a controller for transmitting codes to the computer indicating the keystrokes and combinations of keys depressed. In the embodiment of FIG. 5A a connector receptacle 79 is formed in layer 15 when the layer is molded. A connector cable 81 is provided with an end 83 configured to nest in receptacle 79.

Conductive traces 85 similar to the matrix traces described above are applied to lower layer 15 between pocket 67 and receptacle 79, and along the vertical walls of both openings. Module 17 has contact pads (not shown) on the end facing receptacle 79, similar to the contact pads 73 illustrated in FIG. 5B and FIG. 5C. Similarly, cable end 83 has contact pads 87 for contacting the traces in receptacle 79. The other end of cable 81 has a connector to match the computer receptacle, such as an AMP connector.

Figure 6A:
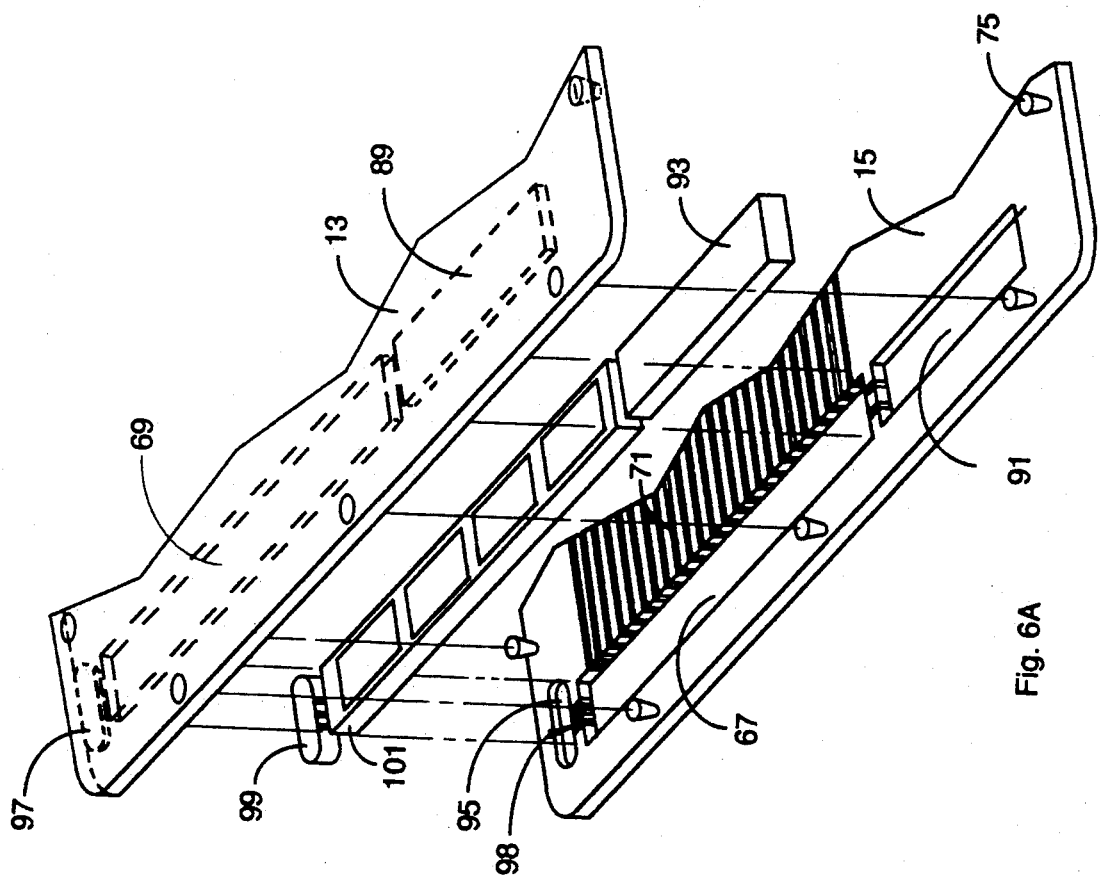
FIG. 6A shows an alternative embodiment that communicates with a suitably equipped computer without a cable.

FIG. 6A shows an alternative embodiment that communicates with a suitably equipped computer without a cable. Layers 13 and 15 have pockets 89 and 91 respectively for positioning and retaining a battery 93 which connects to a control module 101 through traces 98 between the pockets, similar to traces described above for other connections. The battery is made to be about the width and height of the control module to facilitate rolling of the keyboard.

At the other end of pocket 67 for control module 101 there is a pocket 95 in lower layer 15 and another pocket 97 in upper layer 13 to retain a coreless encapsulated magnetic coil 99, which is driven by output signals from control module 101 through connecting traces 98 as described above. In this embodiment the coil is driven at a controlled frequency, and data to be transmitted to a computer is coded into the changing magnetic field produced by the coil. A sensing coil in a computer senses the coded data, decodes it, and puts it on the computer bus as digital data.

Another means of transmission of data from keyboard 11 to an associated computer is coded light transmission. In this embodiment, a light transmitter replaces coil 99, and control module 101 drives the transmitter to send coded signals to a receiver at the computer. Coded light transmission is known in the art for sending data from a keyboard to a computer.

FIG. 6B shows yet another alternative embodiment wherein there is no local control module. In this embodiment conductive traces 71 lead to a pocket 102 formed in layer 15, and a connector 100 and a cable 104 have a number of conductors equal to the number of conductive traces. The connector resides in pocket 102, and the key strokes are communicated through the cable to the computer (not shown). A controller in the computer, not a part of the keyboard, translates the keystrokes, digitizes the data, and places the data on the computer bus. This embodiment has the disadvantage of requiring a cable with many more traces than the embodiments with an on-board controller, but the absence of the controller in the keyboard is an advantage.

Figure 7B:
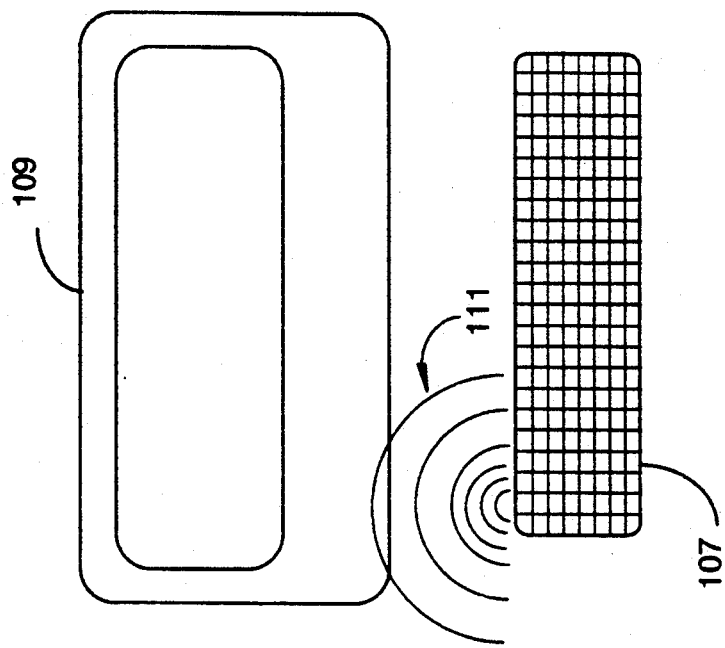
FIG. 7B shows a flexible keyboard according to an embodiment of the invention wherein code is transmitted by a magnetic field.
Figure 7A:
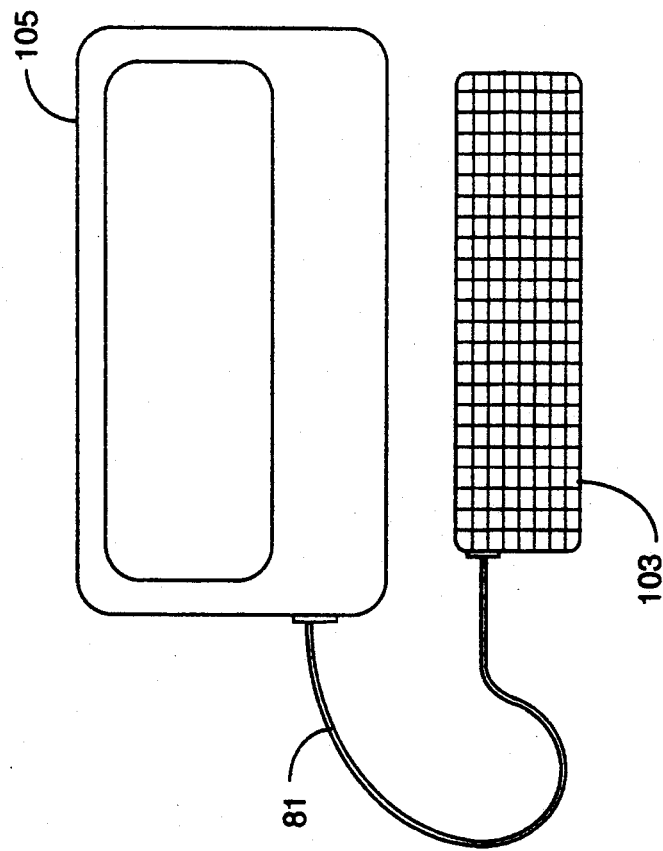
FIG. 7A shows a flexible keyboard according to the present invention connected to a computer by a transmission cable.

FIG. 7A shows a flexible keyboard 103 according to the present invention connected to a computer 105 by a transmission cable 81 as described above. The computer may be of many types, including the popular desktop models. Computers that use keyboards typically include a CPU, an electronic storage system such as a hard disk drive, connected to the CPU and other devices by a bus system, and may also have a display terminal.

FIG. 7B shows a flexible keyboard 107 according to an embodiment of the invention wherein code is transmitted by a magnetic field, coupled with a computer 109. The computer in this case has a coil for sensing the magnetic field 111 produced by the transmission system of the keyboard, and a demodulation system (not shown) for decoding the data transmitted and putting it on the digital bus of the computer for use by the CPU.

It will be apparent to one with skill in the art that there are many changes that might be made to the embodiments described without departing from the spirit and scope of the invention. A number of differences within the scope of the invention are described above. There are many materials that would be suitable, for example, and a number of different ways that key cells might be formed. There are also many different ways traces may be routed, many different kinds of material for forming traces, and different places that pockets might be located for components of the keyboard. Such differences should be considered as within the spirit and scope of the invention, and the claims which follow provide the limitations.

What is claimed is:

1. A keyboard for a computer, comprising:
   a first layer of contiguous flexible material having a plurality of flexible key means formed therein, for converting finger motion into keystrokes;
   a second layer of contiguous flexible material having a plurality of sensing means for creating electrical signals in response to said keystrokes;
   flexible electrical conductor means contacting said plurality of sensing means, for communicating said electrical signals away from each of said sensing means; and
   communication means for communicating information relative to said electrical signals away from said flexible keyboard;
   said keyboard rollable into a cylinder of spiral aspect for storage.

2. A keyboard as in claim 1 wherein said communication means comprises a microprocessor-based keyboard controller carried within said flexible keyboard and in contact with said flexible electrical conductor means, and a cable for connecting to an associated computer, said controller for creating coded signals based on said electrical signals, and said cable for bringing power from said computer and carrying said coded signals to said computer.

3. A keyboard for a computer, comprising:
   a first contiguous flexible layer comprising a plurality of flexible key means formed therein for converting finger motion into keystrokes;
   a second contiguous flexible layer proximate said first contiguous flexible layer comprising a plurality of sensing means for converting said keystrokes to electrical signals;
   electrical conductor means for communicating said electrical signals away from said sensing means;
   joining means for fastening said first and second flexible layers together in a manner allowing relative motion between said first and said second contiguous flexible layers when rolled; and
   communication means for communicating information relative to said electrical signals away from said flexible keyboard;
   said keyboard rollable into a cylinder of spiral aspect for storage.

4. A keyboard as in claim 3 wherein said communication means comprises a microprocessor-based keyboard controller carried within said flexible keyboard and in contact with said flexible electrical conductor means, and a cable for carrying said coded signals to an associated computer, said controller for creating coded signals based on said electrical signals, and said cable for bringing power from said computer and carrying said coded signals to said computer.

5. A keyboard as in claim 3 wherein each of said key means comprises:
   a molded dome shape in said first contiguous flexible layer, configured to collapse under pressure from a user's finger motion and to return to its original shape upon release of said finger pressure, said collapse and return being a single keystroke; and
   an electrically conductive area under said dome shape.

6. A keyboard as in claim 5 wherein said sensing means comprises:
   a surface facing said electrically conductive area under said dome shape;
   a first electrically conductive region on said surface;
   a first electrically conductive trace contacting and leading away from said first electrically conductive region;
   a second electrically conductive region on said surface, spaced apart from said first electrical conductive region; and
   a second electrically conductive trace contacting and leading away from said second electrically conductive region;
   wherein collapse of said dome brings said conductive area under said dome into contact with said surface, establishing electrical contact between said first trace and said second trace.

7. A keyboard as in claim 3 wherein said joining means comprises extensions of flexible material from one of said layers entering and being retained in openings in the other of said layers to permit said layers to move relative to one another by stretching said extensions of flexible material during rolling of the two connected layers into said cylinder of spiral aspect for storage.

8. A keyboard as in claim 4 wherein each of said layers define retaining pockets formed as matching depressions to receive said keyboard controller.

9. A keyboard as in claim 3 comprising:
   a battery for power; and
   wherein said communication means comprises a coil driven by electrical current supplied by said battery to produce a magnetic field; and
   wherein said keyboard controller converts keystrokes and keystroke combinations to encoded signals transmitted as changes in flux in said magnetic field.

10. A computer system comprising:
    CPU means for performing logic and computations;
    bus data transmission means connected to said CPU means for transmitting data;
    electronic storage means connected to said bus data transmission means for storing data and programs; and
    a keyboard comprising:
      a first contiguous flexible layer comprising a plurality of flexible key means formed therein for converting finger motion into keystrokes;
      a second contiguous flexible layer proximate said first contiguous flexible layer comprising a plurality of sensing means for converting said keystrokes to electrical signals;
      electrical conductor means for communicating said electrical signals away from said sensing means;
      joining means for fastening said first and second flexible layers together in a manner allowing relative motion between said first and said second contiguous flexible layers when rolled; and
      communication means for communicating information relative to said electrical signals away from said flexible keyboard;
      said keyboard rollable into a cylinder of spiral aspect for storage.

11. A computer system as in claim 10 wherein said communication means comprises a microprocessor-based keyboard controller carried within said flexible keyboard and in contact with said flexible electrical conductor means, and a cable for carrying said coded signals from said flexible keyboard, said controller for creating coded signals based on said electrical signals, and said cable for bringing power to said flexible keyboard and for carrying said coded signals away from said flexible keyboard.

12. A computer system as in claim 10 wherein said keyboard further comprises a battery for power, said communication means comprises a coil driven by electrical current supplied by said battery to produce a magnetic field, and said keyboard controller converts keystrokes and keystroke combinations to encoded signals transmitted as changes in flux in said magnetic field.

* * * * *